No. 798,748. PATENTED SEPT. 5, 1905.
W. C. ROBINSON.
CONDUIT FOR ELECTRICAL CONDUCTORS.
APPLICATION FILED OCT. 5, 1904.

WITNESSES:
Herbert Bradley.
Fred Kirchner

INVENTOR
William C. Robinson,
by Christy & Christy, Att'ys

UNITED STATES PATENT OFFICE.

WILLIAM CHRISTOPHER ROBINSON, OF ALLEGHENY, PENNSYLVANIA.

CONDUIT FOR ELECTRICAL CONDUCTORS.

No. 798,748.   Specification of Letters Patent.   Patented Sept. 5, 1905.

Application filed October 5, 1904. Serial No. 227,281.

*To all whom it may concern:*

Be it known that I, WILLIAM CHRISTOPHER ROBINSON, a citizen of the United States, residing at Allegheny, in the county of Allegheny and State of Pennsylvania, have invented or discovered a certain new and useful Improvement in Conduits for Electrical Conductors, of which improvement the following is a specification.

My invention consists in an insulating-conduit for electrical conductors which can be manufactured very cheaply and which can be securely applied to the interior walls of a building or room in the place of the usual molding. When so applied, it not only affords an insulating and non-inflammable casing for conductors of electrical currents of high potential, but at the same time affords a neat and attractive support for the hanging of framed pictures or other wall ornaments.

Figure 1:
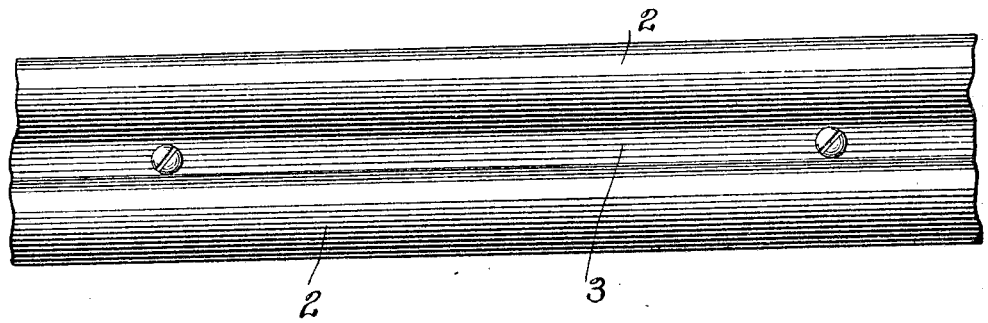
Figure 2:
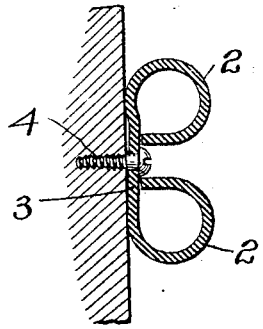

In the accompanying drawings, Figure 1 is a plan view, and Fig. 2 a vertical section, of my improved conduit fastened to the wall of a room or other suitable support.

The conduit is formed of a single strip of metal, the opposite edges of which are bent over toward and substantially upon the central portion of the strip to form a pair of oppositely-disposed substantially cylindrical tubes 2, connected by a flat integral web 3, tangential to the tubular portions. I prefer that the oppositely-disposed inner walls of the tubes shall be separated by a sufficient space to afford access for the insertion through suitable holes in the web 3 of screws 4 or other means of attachment of the conduit to the wall or other support, as illustrated in the drawings. The rear wall of the web should be made slightly concave, as shown in Fig. 2 of the drawings, in order that the conduit may have two lines of bearing against the support, such lines of bearing being on opposite sides of the attaching-screws. This construction prevents any rocking movement of the conduit when secured in position. The interior walls of the tubes are of course coated with a film of insulating material, such as an insulating-varnish of any desired thickness, and the exterior surface of the conduit may be painted or ornamented as desired.

I am aware that I am not the first to devise a combined electrical conduit and molding; but my invention differs from any of which I have knowledge in that the web connecting the tubular portions forms a firm bearing for the molding, and when the molding is secured in position the tubular portions project outwardly from the web, concealing the attaching-screws.

This simple construction can be made in a rolling or edge-bending machine, whereas other forms of conduits of this character require a further stamping after the bending of the edge to bring them to finished form.

I claim herein as my invention—

A metallic conduit for electrical conductors, consisting of two tubular portions and a web portion intermediate of the tubular portions and integral therewith, said web portion being tangential to said tubular portions, and the surface of the web opposite said tubular portions being concave to form longitudinal bearing-lines for the conduit, substantially as described.

In testimony whereof I have hereunto set my hand.

WILLIAM CHRISTOPHER ROBINSON.

Witnesses:
 ALICE A. TRILL,
 MARSHALL A. CHRISTY.